May 6, 1952 — G. L. RIORDAN — 2,595,541
TOOL FOR SHAPING THE ENDS OF CONDUITS
Filed Dec. 12, 1947 — 3 Sheets-Sheet 1
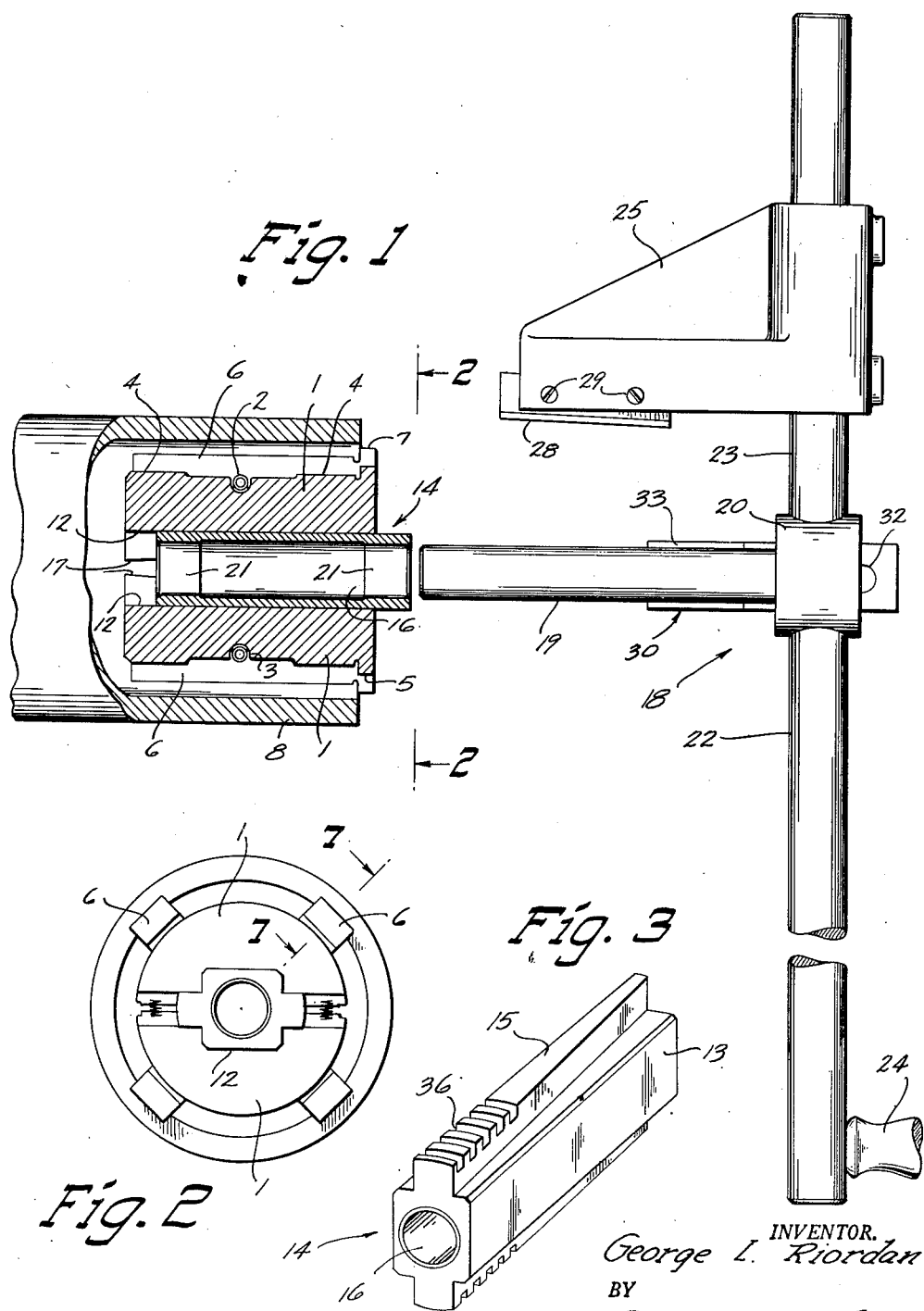

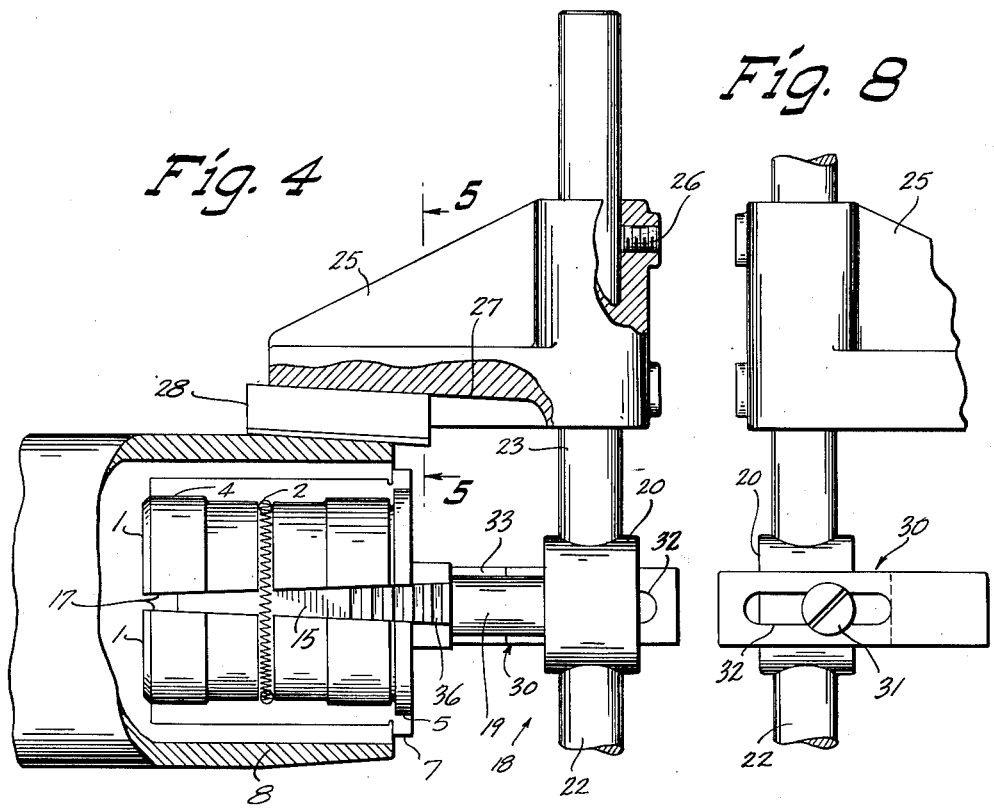
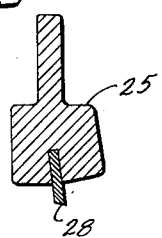
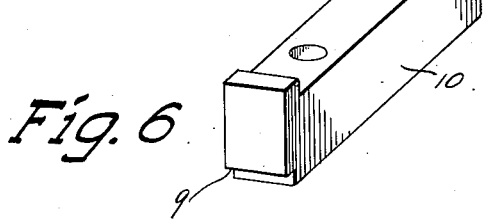
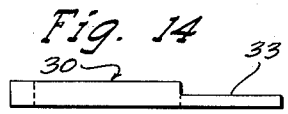

May 6, 1952     G. L. RIORDAN     2,595,541
TOOL FOR SHAPING THE ENDS OF CONDUITS
Filed Dec. 12, 1947     3 Sheets-Sheet 3
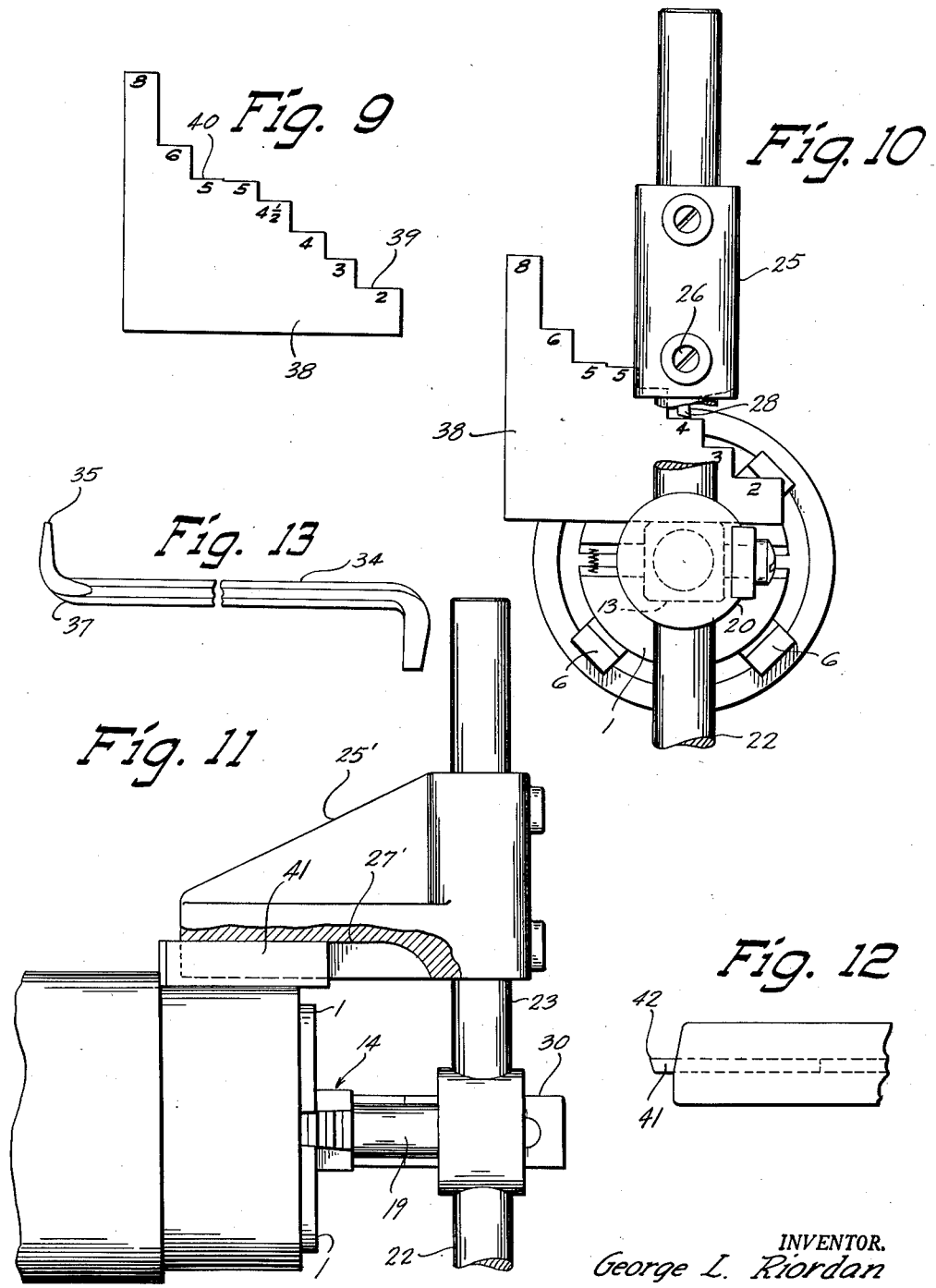
INVENTOR.
George L. Riordan
BY
Arthur R. Woolfolk
Attorney Patented May 6, 1952

2,595,541

UNITED STATES PATENT OFFICE 2,595,541

TOOL FOR SHAPING THE ENDS OF CONDUITS

George L. Riordan, Milwaukee, Wis., assignor to McGraw Electric Company, a corporation of Delaware Application December 12, 1947, Serial No. 791,355

4 Claims. (Cl. 144—205)

This invention relates to a tool for shaping the ends of conduits such, for example, as fiber or similar conduits.

This invention is an improvement over that disclosed in United States Patent No. 1,823,959, issued September 22, 1931, to Alwin G. Steinmayer for Tool For Shaping The Ends of Conduits, assigned to the same assignee as this application.

Objects of this invention are to provide a tool for shaping the ends of conduits so that they may be fitted into the coupling sleeves or into the next adjacent section of conduit, and to so construct the tool that it is of extreme simplicity and has a small number of parts and is easily portable.

Further specific objects of this invention are to provide a tool for shaping the ends of conduits in which the axis about which the tool rotates is located with reference to the interior of the conduit so that irrespective of irregularities in the external contour of the conduit a true and accurate shaping will be secured so that the interior of one section of conduit will align with the interior of the next adjacent section of conduit.

Specific objects of this invention are to provide a simple type of expanding mandrel in which a centrally located bearing member is effective to expand the mandrel, and in which this bearing member provides a bearing structure for revolubly and slidably supporting a shaft of a unitary assembly consisting of a tool and a handle for rotating the tool.

Further objects are to provide a tool for shaping the ends of conduits in which the rate of feed is determined by the amount of pressure exerted axially of the unitary cutting assembly so that the rate of feed may be determined by the operator and proportioned to the toughness of the material being operated upon without requiring any feeding mechanism whatsoever and without requiring any particular exertion on the part of the operator.

Further objects are to provide a tool for shaping the ends of conduits and a gauge therefor which coacts with the tool in the initial setting of the cutter, the gauge being arranged to rest upon a portion of the expanding mandrel and being provided with a series of graduated shoulders arranged to engage a preselected portion of the cutter so that the cutter may be initially adjusted for the particular size of conduit to be operated upon.

Embodiments of the invention are shown in the accompanying drawings, in which:

Figure 1 is a side elevation partly in section showing the expanding mandrel in position in the conduit and the pilot shaft of the cutter assembly about to be inserted into the mandrel.

Figure 2 is an end view of the mandrel in position in the conduit, such view being taken on the line 2—2 of Figure 1.

Figure 3 is a perspective view of the bearing member of the mandrel which also acts as the expanding member.

Figure 4 is a view partly broken away and partly in section showing the position of the parts when the shaping of the end of the conduit is just completed.

Figure 5 is a sectional view on the line 5—5 of Figure 4.

Figure 6 is a view of an extra jaw which may be applied to the mandrel for larger sizes of conduit.

Figure 7 is a fragmentary sectional view showing the extra jaw in place on the mandrel.

Figure 8 is a view from the reverse side of that shown in Figure 4, such view being partly broken away.

Figure 9 is a view of the gauge used in the initial setting of the cutter.

Figure 10 is a view partly broken away showing the manner in which the gauge is used.

Figure 11 is a view showing a further form of cutter, such view being partly broken away and partly in section.

Figure 12 is a fragmentary view looking down on the cutter head of Figure 11.

Figure 13 is a view of an offset screwdriver which is useful in withdrawing the bearing member from the mandrel and in other adjustments of the device.

Figure 14 is a side view of the stop gauge for limiting the depth of cut.

Referring to the drawings, it will be seen that the device comprises an expanding mandrel having a pair of jaws 1, 1. These jaws are normally held together in a yielding manner by means of the circular spiral spring 2 which is seated within a peripheral groove 3 formed in the jaws 1, 1. The jaws are provided with cylindrical portions 4, 4 which, in the small size of conduit, may bear against the inner side of the conduit. The jaws are also provided with flanges 5 adjacent their outer ends to limit the extent to which the jaws may be inserted into the conduit when the jaws are used alone. However, as shown in the drawings, the jaws may each be provided with a pair of blocks or extension jaws 6. These extension jaws 6 also are provided with end flanges 7 which are arranged to engage the end of the conduit 8 as shown in Figure 1 and thus limit the extent to which the expanding mandrel may be inserted into the conduit. These extension jaws 6 are also provided with recessed or cutaway portions to clear the flange 5 of the main jaws 1, 1. This cutaway portion is indicated by the reference character 9 for a larger size of extension jaw indicated by the reference character 10 in Figure 7. The extension jaws in all cases are held to the main jaws 1, 1 by means of screws 11 as shown in Figure 7. The main jaws are provided with a rectangular groove 12, see Figures 1 and 2, which receive the rectangular portion 13 of the wedge-like bearing member 14. This wedge-like bearing member is provided with tapered side flanges 15 as shown most clearly in Figures 3 and 4, and is provided with a central hole 16 therethrough. The tapered side flanges 15 bear against the tapered opposed faces 17 of the main jaws and thus when the tapered bearing member indicated generally at 14 is driven inwardly the mandrel is expanded and binds against the inner surface of the conduit 8.

A cutter assembly indicated generally by the reference character 18 is provided and arranged to coact with the expanding mandrel. This cutter assembly comprises a pilot shaft 19 which projects from a hub portion 20 and is adapted to be inserted in the hole 16 of the wedge-like bearing member 14. It is to be noted in this connection, that two finished surfaces 21 are inside of the hole 16 of the bearing member 14 so as to get a true fit and widely spaced supports for the shaft 19.

The hub 20 is provided with rods 22 and 23 which project in opposite directions therefrom. It is preferable to form the rods 22 and 23 integrally. One of the rods is provided with a handle 24 and the other rod slidably receives the cutter head 25, which cutter head is locked in place at its adjusted position by means of the set screws 26. The cutter head is provided with a tapered slot 27, see Figure 4, which receives the cutter or blade 28. This blade is held in position by means of set screws 29. A stop or gauge 30 is adjustably secured to the hub 20 by means of a screw 31 screwed into the hub 20 and passing through an elongated slot 32 in the stop or gauge 30. This stop or gauge 30, as may be seen from Figure 14, is provided with a cutaway portion 33 in order to clear the tapered side members 15 of the wedge. It is to be noted that the stop 30 is located in contact with a slightly cut-away portion of the outer periphery of the hub 20, see Figures 8 and 10, and this positioning of the stop exteriorly of the hub 20, together with the cut-away construction of the stop, see Figure 14, enables the stop to clear the wedge member and contact with the jaws 1 when the device is in its innermost position. The stop or gauge 30 is adapted to engage the front face of the jaws 1, 1 of the mandrel.

In using the device the jaws 1, 1 are slipped into the end of the conduit 8 and the wedge or bearing member 14 is positioned between the jaws. The flanges 7 of the extension jaws 6 engage the front end of the conduit 8 and definitely position the mandrel. The tapered bearing member 14 is driven in between the jaws 1, 1 and expands them and causes binding against the inside of the conduit. Thereafter the shaft 19 is inserted in the hole 16 of the bearing member 14 and the cutter assembly is rotated by means of the handle 24. This is continued until the requisite length of cut has been made. It has been found that the device cuts the conduit smoothly and in a true fashion and no automatic feed is required. A very slight pressure is imparted to the handle to move the cutter assembly inwardly as the cutting progresses. This operation is continued until the gauge or stop 30 engages the front face of the jaws 1, 1 and thus determines the length of cut.

It is to be noted from Figure 5 that the blade 28 is preferably set on a slight slant to facilitate the cutting.

When the shaping of the end of the conduit is completed the mandrel is first collapsed and then removed. This operation is facilitated by the use of the offset screwdriver 34, see Figure 13. This screwdriver has one of its lateral blades 35 arranged to be inserted in an appropriate notch 36, see Figures 3 and 4, of the bearing member 14. Thereafter the operator merely rocks the offset screwdriver 34 about its heel portion 37, such heel portion bearing against the front face of one of the jaws or members 1, 1 of the expanding mandrel. In this way, the central bearing member is withdrawn and the mandrel is thereby allowed to collapse and may be freely removed from the end of the conduit.

It is to be understood that the device is intended to operate on any one of many sizes of conduits. Different sized extension jaws 6 in Figure 1 or 10 in Figure 7 are employed according to the size of the conduit operated upon. Further a gauge 38, see Figures 9 and 10, may be employed to assist in the adjustment of the cutter head 25 for the particular size of conduit to be operated upon. This gauge 38 is provided with a series of shoulders 39 with the corresponding size of conduit marked adjacent the shoulders. In using the gauge the bottom, as viewed in Figures 9 and 10, is positioned on one of the flat faces of the rectangular portion 13 of the bearing member as shown in Figure 10. The cutter head 25 is then moved down until a selected portion, for example the rear part of the blade 28, engages the selected appropriate shoulder. Thereafter the screws 26 are tightened and the cutter head is then set at the correct position for the corresponding sizes of conduits. This gauge may have one or more additional shoulders, for example, as indicated at 40 in Figure 9, to correspond to the size of fiber pipe which differs slightly in diameter from the fiber conduit.

The device as described hereinabove is intended to cut a taper on the end of the fiber conduit or fiber pipe. It sometimes is desirable to make a cylindrical cut instead of the tapered cut. This is readily accomplished by the construction shown in Figures 11 and 12. In this form of the invention the cutter head 25' is provided with a straight slot 27' which is not tapered but which parallels the axis of the shaft 19. The blade or cutter is indicated by the reference character 41 and is provided with a cutting edge 42 at its outermost end.

It will be seen that a novel form of conduit shaping device has been provided by this invention which is of very simple construction and which is freely portable and does not occupy a large amount of space and is devoid of any complicated feeding mechanism, but which is so made that it feeds itself as the cutting progresses when a slight pressure is applied axially of the cutter assembly.

It will be seen further that the device can be set with a good degree of accuracy by means of the gauge hereinabove described. On the other hand, it is preferable to rely on this setting primarily for the rough cut and to obtain the accurate setting by taking a previously shaped conduit and adjusting the device in accordance therewith. Either or both of these methods can be employed.

Further it is to be noted that the device is easy to operate and does not require much effort on the part of the operator.

Although this invention has been described in considerable detail, it is to be understood that such description is intended as illustrative rather than limiting, as the invention may be variously embodied and is to be interpreted as claimed.

I claim:

1. A tool for shaping the ends of conduits comprising an expanding mandrel arranged to be inserted into the end of a conduit and including relatively movable members and a central tapered member positioned between said movable members and arranged to be driven inwardly to force said relatively movable members apart, a shaft supported by said central member, a cutter supported from said shaft, and a crank supported from said shaft and arranged to rotate said cutter about the end portion of said conduit, said central tapered member having notches along its side portion arranged to receive an extracting tool to longitudinally extract said tapered member.

2. A tool for shaping the ends of conduits comprising an expanding mandrel arranged to be inserted into the end of a conduit and including a pair of relatively movable members arranged to engage the inner surface of the conduit, a central bearing member located between said relatively movable members and having radially projecting side portions provided with tapered faces arranged to force said relatively movable members apart when said bearing member is driven inwardly, said bearing member having a hole therethrough located axially of said expanding mandrel, and a unitary assembly including a shaft adapted to be inserted into the hole of said bearing member, a cutter supported from said shaft, and a handle supported from said shaft and arranged to rotate said cutter about said conduit.

3. A tool for shaping the ends of conduits comprising an expanding mandrel arranged to be inserted into the end of a conduit and including relatively movable members arranged to engage the inner surface of the conduit, a central bearing member located between said relatively movable members and having tapered side portions arranged to force said relatively movable members apart when said bearing member is driven inwardly, said bearing member having a rectangular central portion and said relatively movable members having grooves therein coacting with said rectangular portion to guide said bearing member, said bearing member having a hole therethrough axially of said expanding mandrel, and a unitary assembly including a shaft arranged to be inserted into the hole of said bearing member, a cutter adjustably supported from said shaft, and a handle supported from said shaft and arranged to rotate said cutter about said conduit.

4. A tool for shaping the ends of conduits comprising an expanding mandrel arranged to be inserted into the end of a conduit and including relatively movable members arranged to engage the inner surface of the conduit, a central bearing member located between said relatively movable members and having tapered side portions arranged to force said relatively movable members apart when said bearing member is driven inwardly, said bearing member having a rectangular central portion and said relatively movable members having grooves therein coacting with said rectangular portion to guide said bearing member, said bearing member having a hole therethrough axially of said expanding mandrel, and a unitary assembly including a shaft arranged to be inserted into the hole of said bearing member, a cutter adjustably supported from said shaft, a handle supported from said shaft and arranged to rotate said cutter about said conduit, and an adjustable stop member supported from said shaft and adjustable axially and arranged to engage said mandrel to determine the length of the cut made on the end of said conduit.

GEORGE L. RIORDAN.

REFERENCES CITED

The following references are of record in the file of this patent:

UNITED STATES PATENTS

| Number | Name | Date |
| --- | --- | --- |
| 1,099,215 | Sullivan | June 9, 1914 |
| 1,823,959 | Steinmayer | Sept. 22, 1931 |
| 1,841,550 | Parker | Jan. 19, 1932 |
| 1,915,350 | Anderson | June 27, 1933 |
| 2,289,631 | Cuda et al. | July 14, 1942 |
| 2,348,186 | Bashore | May 9, 1944 |